US011422870B2

(12) United States Patent
Sureshkumar et al.

(10) Patent No.: US 11,422,870 B2
(45) Date of Patent: Aug. 23, 2022

(54) MANAGING AND ROUTING MESSAGES TO DISTRIBUTED USER DEVICES IN AN ENTERPRISE COMPUTING ENVIRONMENT

(71) Applicant: Bank of America Corporation, Charlotte, NC (US)

(72) Inventors: Moses Sureshkumar, Weddington, NC (US); John Schils, Charlotte, NC (US); Mohan Kumar Jadamuthu, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 364 days.

(21) Appl. No.: 16/808,810

(22) Filed: Mar. 4, 2020

(65) Prior Publication Data

US 2021/0279116 A1 Sep. 9, 2021

(51) Int. Cl.

| | |
|---|---|
| ***G06F 9/54*** | (2006.01) |
| ***G06F 16/953*** | (2019.01) |
| ***H04L 9/40*** | (2022.01) |
| ***H04L 67/306*** | (2022.01) |
| ***H04L 51/224*** | (2022.01) |
| ***H04L 51/234*** | (2022.01) |
| ***G06N 20/00*** | (2019.01) |
| ***H04L 67/02*** | (2022.01) |

(52) U.S. Cl.

CPC ............ *G06F 9/542* (2013.01); *G06F 16/953* (2019.01); *G06N 20/00* (2019.01); *H04L 51/24* (2013.01); *H04L 51/34* (2013.01); *H04L 63/08* (2013.01); *H04L 63/105* (2013.01); *H04L 67/306* (2013.01); *H04L 67/02* (2013.01)

(58) Field of Classification Search

CPC .... G06F 9/542; G06F 16/953; G06F 16/9535; G06N 20/00; H04L 51/24; H04L 51/34; H04L 63/08; H04L 63/105; H04L 67/306; H04L 67/02; H04L 67/10; H04L 67/26; H04L 67/22; H04L 51/30; H04L 51/046; H04L 51/18

USPC .............................................................. 726/4

See application file for complete search history.

(56) References Cited

U.S. PATENT DOCUMENTS 8,407,776 B2 3/2013 Somani et al.
8,788,881 B2 7/2014 Salomon et al.
9,148,460 B1 9/2015 Sun et al.
(Continued)

*Primary Examiner* — Kambiz Zand
*Assistant Examiner* — Aubrey H Wyszynski
(74) *Attorney, Agent, or Firm* — Banner & Witcott, Ltd.

(57) ABSTRACT

Aspects of the disclosure relate to managing and routing messages to distributed user devices in an enterprise computing environment. In some embodiments, a computing platform may receive an application content request from an enterprise tablet computing device. The computing platform may generate and send a database query, which may cause a message database server to select message data from a message database hosted by the message database server. After sending the database query, the computing platform may receive, from the message database server, the message data selected from the message database. Subsequently, the computing platform may generate a notification for the enterprise tablet computing device and may send the notification to the enterprise tablet computing device, which may cause the enterprise tablet computing device to display the notification.

20 Claims, 10 Drawing Sheets

(56) References Cited

U.S. PATENT DOCUMENTS

| | | | | |
|---|---|---|---|---|
| 2013/0208880 | A1* | 8/2013 | Lovy | H04L 43/045 379/265.03 |
| 2018/0211509 | A1* | 7/2018 | Ramaci | G08B 5/36 |
| 2020/0068028 | A1 | 2/2020 | Gurtin et al. | |
| 2020/0068029 | A1* | 2/2020 | Lim | H04W 4/02 |
| 2020/0068030 | A1 | 2/2020 | Niewczas | |
| 2020/0068041 | A1 | 2/2020 | Latapie et al. | |
| 2020/0068072 | A1 | 2/2020 | Ramprasad | |
| 2020/0068088 | A1 | 2/2020 | Yamakado et al. | |
| 2020/0068192 | A1 | 2/2020 | Pelski | |
| 2020/0068227 | A1 | 2/2020 | Han et al. | |
| 2020/0068235 | A1 | 2/2020 | Han et al. | |
| 2020/0068254 | A9 | 2/2020 | Oklejas | |
| 2020/0068273 | A1 | 2/2020 | Putnam | |
| 2020/0068339 | A1 | 2/2020 | Iska et al. | |
| 2020/0068341 | A1 | 2/2020 | Iska et al. | |
| 2020/0068343 | A1 | 2/2020 | Long | |
| 2020/0068374 | A1* | 2/2020 | Mehta | H04W 4/029 |
| 2020/0068376 | A1 | 2/2020 | Dames et al. | |
| 2020/0068377 | A1 | 2/2020 | Gideon, III | |
| 2020/0068399 | A1* | 2/2020 | Brown | H04L 63/0861 |
| 2020/0068400 | A1 | 2/2020 | Ramie et al. | |
| 2020/0068411 | A1 | 2/2020 | Vagelos | |
| 2020/0068419 | A1* | 2/2020 | Decuir | H04W 8/005 |
| 2020/0068433 | A1 | 2/2020 | Nammi et al. | |
| 2020/0068462 | A1 | 2/2020 | Zetterberg et al. | |
| 2020/0068483 | A1 | 2/2020 | Likar et al. | |
| 2020/0068486 | A1 | 2/2020 | Asterjadhi et al. | |
| 2020/0068636 | A1 | 2/2020 | Huang et al. | |
| 2020/0068684 | A1 | 2/2020 | Ramer et al. | |
| 2020/0068686 | A1 | 2/2020 | Harrison et al. | |
| 2020/0068687 | A1 | 2/2020 | Harrison et al. | |
| 2020/0068759 | A1 | 2/2020 | Cvijetinovic et al. | |
| 2020/0356462 | A1* | 11/2020 | Anand | G06F 11/3495 |

* cited by examiner

MANAGING AND ROUTING MESSAGES TO DISTRIBUTED USER DEVICES IN AN ENTERPRISE COMPUTING ENVIRONMENT

BACKGROUND

Aspects of the disclosure relate to receiving, processing, and sending electronic messages to policy-managed user devices in an enterprise computing environment. In particular, one or more aspects of the disclosure relate to managing and routing messages to distributed user devices in an enterprise computing environment.

Enterprise organizations may utilize various computing infrastructure to maintain confidential information and/or other sensitive data that is created and/or used for various purposes. Ensuring that this data is secure and only accessible to appropriate users for appropriate purposes may be critically important to protecting the integrity and confidentiality of the underlying information and associated resources. Increasingly, enterprise organizations are using and deploying mobile device management (MDM) software in hopes of protecting the integrity and confidentiality of enterprise information and associated resources. In many instances, however, it may be difficult to maintain and/or provide a relatively full scope of enterprise application functionality and also optimize the resource utilization, bandwidth utilization, and efficient operations of the enterprise computing infrastructure, when implementing such MDM software.

SUMMARY

Aspects of the disclosure provide effective, efficient, scalable, and convenient technical solutions that address and overcome the technical problems associated with ensuring information security and preventing unauthorized access to enterprise-managed information and enterprise resources by managing and routing messages to distributed user devices in an enterprise computing environment.

In accordance with one or more embodiments, a computing platform having at least one processor, a communication interface, and memory may receive, via the communication interface, from a first enterprise tablet computing device, an application content request, and the application content request may include user profile information linked to an authenticated user of the first enterprise tablet computing device. Subsequently, the computing platform may generate a database query based on the application content request received from the first enterprise tablet computing device. Then, the computing platform may send, via the communication interface, to a message database server, the database query, and sending the database query to the message database server may cause the message database server to select message data from a message database hosted by the message database server. After sending the database query to the message database server, the computing platform may receive, via the communication interface, from the message database server, the message data selected from the message database hosted by the message database server. Subsequently, the computing platform may generate a notification for the first enterprise tablet computing device based on the message data received from the message database server. Then, the computing platform may send, via the communication interface, to the first enterprise tablet computing device, the notification generated for the first enterprise tablet computing device based on the message data received from the message database server. In addition, sending the notification generated for the first enterprise tablet computing device based on the message data received from the message database server may cause the first enterprise tablet computing device to display the notification generated for the first enterprise tablet computing device based on the message data received from the message database server.

In some embodiments, receiving the application content request from the first enterprise tablet computing device may include receiving a unique user identifier linked to the authenticated user of the first enterprise tablet computing device.

In some embodiments, receiving the application content request from the first enterprise tablet computing device may include receiving enterprise role information identifying a role of the authenticated user of the first enterprise tablet computing device within an enterprise organization associated with the first enterprise tablet computing device.

In some embodiments, prior to receiving the application content request from the first enterprise tablet computing device, the computing platform may receive a message creation request. Subsequently, the computing platform may generate one or more database commands based on the message creation request. Then, the computing platform may send, via the communication interface, to the message database server, the one or more database commands generated based on the message creation request. In addition, sending the one or more database commands to the message database server may cause the message database server to create a message object in the message database hosted by the message database server.

In some embodiments, receiving the message creation request may include receiving the message creation request via a web portal provided to an internal enterprise user. In some embodiments, receiving the message creation request may include receiving the message creation request via a database interface provided to an enterprise developer.

In some embodiments, generating the one or more database commands based on the message creation request may include generating at least one command that causes the message database server to set one or more flags identifying one or more recipients of a new message, store content of the new message, and set one or more flags identifying an active or inactive status of the new message.

In some embodiments, generating the at least one command that causes the message database server to set the one or more flags identifying the one or more recipients of the new message may include configuring the at least one command to identify the one or more recipients of the new message based on one or more unique user identifiers corresponding to the one or more recipients of the new message.

In some embodiments, generating the at least one command that causes the message database server to set the one or more flags identifying the one or more recipients of the new message may include configuring the at least one command to identify the one or more recipients of the new message based on a common enterprise role corresponding to the one or more recipients of the new message.

In some embodiments, sending the one or more database commands to the message database server may cause the message database server to configure the message object to include a tracking parameter for tracking whether message content associated with the message object has been viewed by one or more specific enterprise users.

In some embodiments, prior to receiving the application content request from the first enterprise tablet computing device, the computing platform may validate an authentication request received from the first enterprise tablet computing device.

In some embodiments, after sending the notification to the first enterprise tablet computing device, the computing platform may generate message tracking data based on sending the notification to the first enterprise tablet computing device. Subsequently, the computing platform may send the message tracking data to the message database server, and sending the message tracking data to the message database server may cause the message database server to update a tracking parameter of a message object associated with the notification.

In some embodiments, after sending the notification to the first enterprise tablet computing device, the computing platform may generate one or more message recommendations based on a machine learning model. Subsequently, the computing platform may send the one or more message recommendations generated based on the machine learning model to a second enterprise tablet computing device different from the first enterprise tablet computing device.

In some embodiments, the computing platform may update the machine learning model based on sending the one or more message recommendations to the second enterprise tablet computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
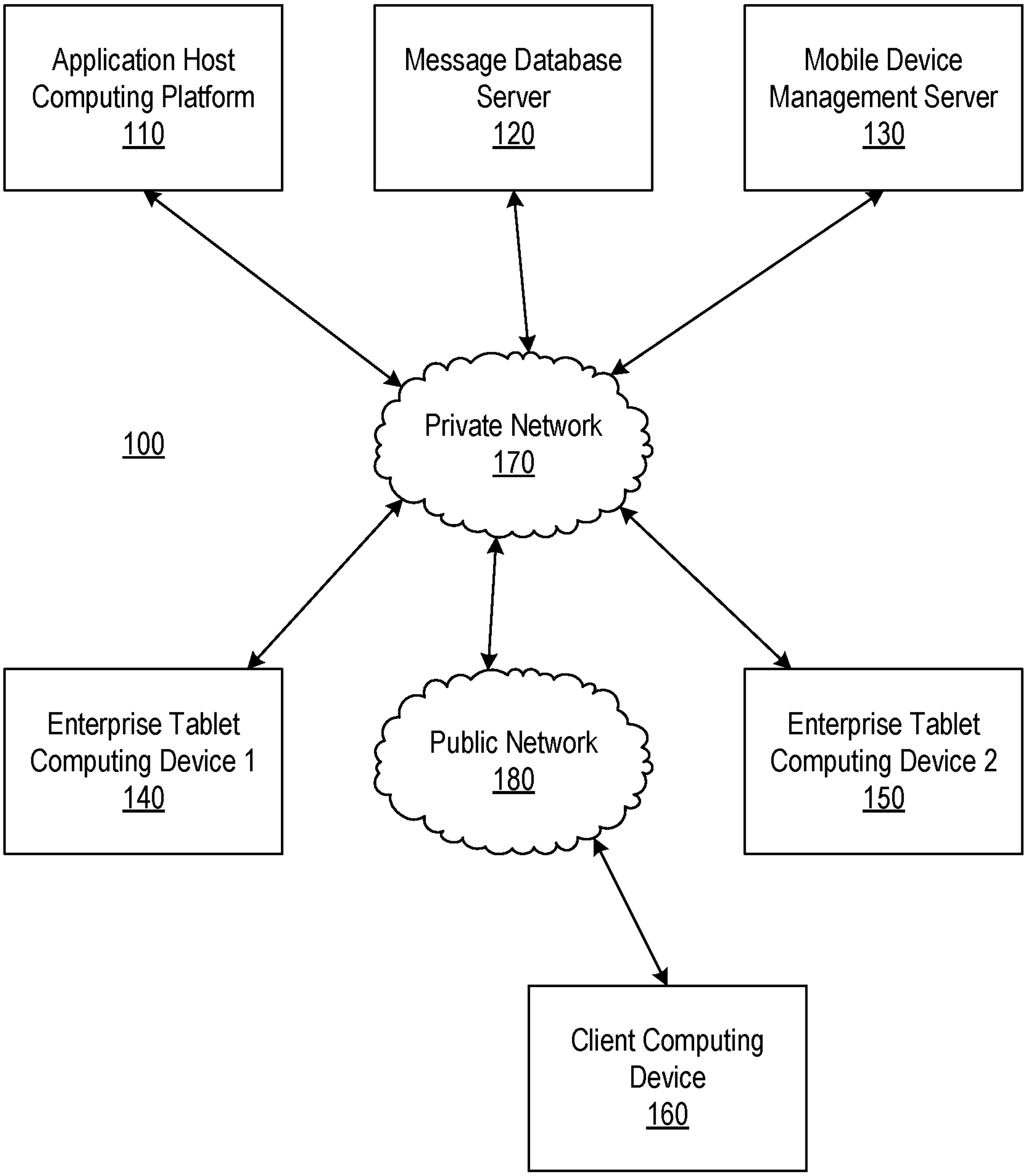
FIGS. 1A and 1B depict an illustrative computing environment for managing and routing messages to distributed user devices in an enterprise computing environment in accordance with one or more example embodiments.
Figure 1B:
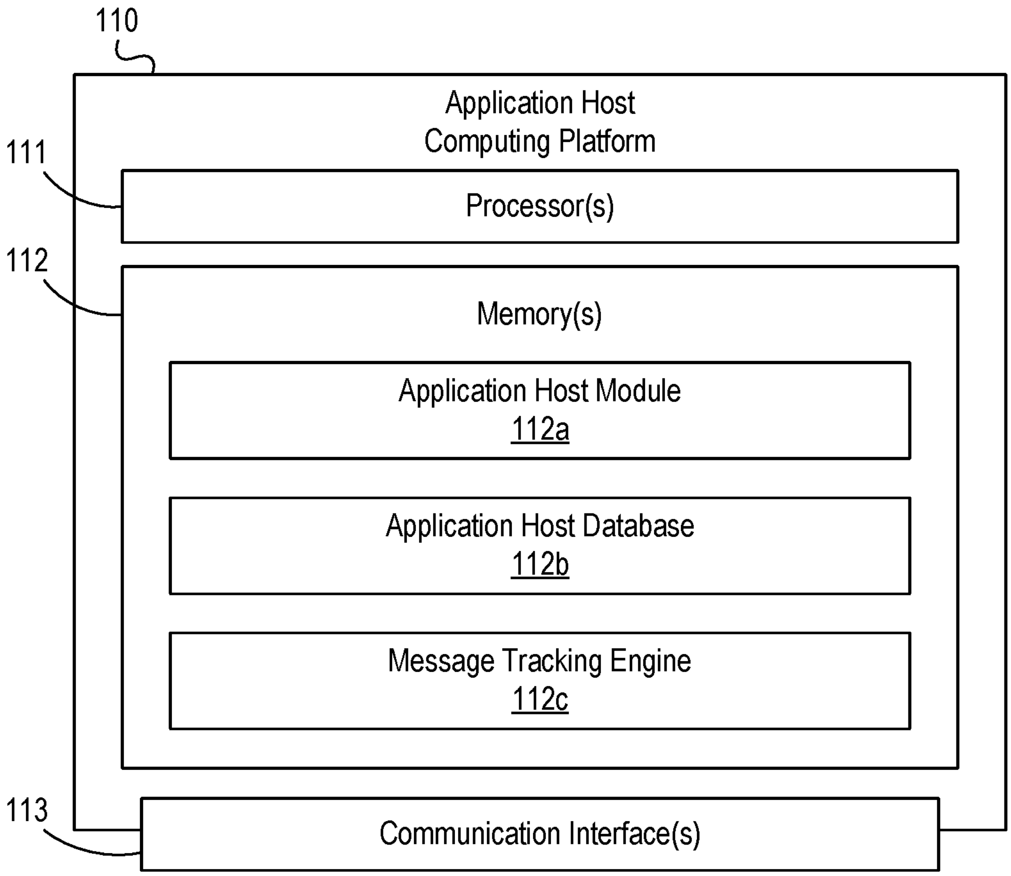

FIGS. 1A and 1B depict an illustrative computing environment for managing and routing messages to distributed user devices in an enterprise computing environment in accordance with one or more example embodiments. Referring to FIG. 1A, computing environment 100 may include one or more computer systems. For example, computing environment 100 may include an application host computing platform 110, a message database server 120, a mobile device management server 130, a first enterprise tablet computing device 140, a second enterprise tablet computing device 150, and a client computing device 160.

As illustrated in greater detail below, application host computing platform 110 may include one or more computing devices configured to perform one or more of the functions described herein. For example, application host computing platform 110 may include one or more computers (e.g., laptop computers, desktop computers, servers, server blades, or the like).

Message database server 120 may include one or more computing devices and/or other computer components (e.g., processors, memories, communication interfaces). In addition, and as illustrated in greater detail below, message database server 120 may be configured to store and/or otherwise host a message database in which various types of message data may be stored and/or otherwise maintained.

Mobile device management server 130 may include one or more computing devices and/or other computer components (e.g., processors, memories, communication interfaces). In addition, and as illustrated in greater detail below, mobile device management server 130 may be configured to enforce one or more enterprise policies, such as one or more enterprise mobile device management policies, on one or more enterprise devices (e.g., enterprise tablet computing device 140, enterprise tablet computing device 150). Additionally or alternatively, mobile device management server 130 may interface with other enterprise systems in computing environment 100 to define, activate, deactivate, and/or otherwise manage specific enterprise policies.

Enterprise tablet computing device 140 may be a mobile computing device comprising one or more touch-sensitive display screens. In some instances, enterprise tablet computing device 140 may have a 'tablet' form factor (which may, e.g., be relatively larger than a 'smartphone' form factor). In addition, enterprise tablet computing device 140 may be linked to and/or used by a specific enterprise user (who may, e.g., be an employee or other affiliate of an enterprise organization operating application host computing platform 110). For instance, enterprise tablet computing device 140 may be linked to and/or used by a first enterprise user at a first enterprise location, such as at a first banking center operated by the enterprise organization.

Enterprise tablet computing device 150 also may be a mobile computing device comprising one or more touch-sensitive display screens. In some instances, enterprise tablet computing device 150 also may have a 'tablet' form factor (which may, e.g., be relatively larger than a 'smartphone' form factor). In addition, enterprise tablet computing device 150 may be linked to and/or used by a specific enterprise user (who may, e.g., be an employee or other affiliate of an enterprise organization operating application host computing platform 110). For instance, enterprise tablet computing device 150 may be linked to and/or used by a second enterprise user at a second enterprise location, such as at a second banking center operated by the enterprise organization (where, e.g., the second enterprise user is different from the first enterprise user, and the second enterprise location is different than the first enterprise location).

Client computing device 160 may be a personal computing device (e.g., desktop computer, laptop computer) or mobile computing device (e.g., smartphone, tablet). In addition, client computing device 160 may be linked to and/or used by a specific non-enterprise user (who may, e.g., be a customer of an enterprise organization operating application host computing platform 110). For instance, client computing device 160 may be linked to and/or used by a non-enterprise user (e.g., different from the first enterprise user associated with enterprise tablet computing device 140 and the second enterprise user associated with enterprise tablet computing device 150) at the first enterprise location or the second enterprise location (or, e.g., at a non-enterprise location different from the first enterprise location or the second enterprise location).

Computing environment 100 also may include one or more networks, which may interconnect one or more of application host computing platform 110, message database server 120, mobile device management server 130, enterprise tablet computing device 140, enterprise tablet computing device 150, and client computing device 160. For example, computing environment 100 may include a private network 170 (which may, e.g., interconnect application host computing platform 110, message database server 120, mobile device management server 130, enterprise tablet computing device 140, enterprise tablet computing device 150, and/or one or more other systems which may be associated with an organization, such as a financial institution) and public network 180 (which may, e.g., interconnect client computing device 160 with private network 170 and/or one or more other systems, public networks, sub-networks, and/or the like).

In one or more arrangements, message database server 120, mobile device management server 130, enterprise tablet computing device 140, enterprise tablet computing device 150, client computing device 160, and/or the other systems included in computing environment 100 may be any type of computing device capable of receiving a user interface, receiving input via the user interface, and communicating the received input to one or more other computing devices. For example, message database server 120, mobile device management server 130, enterprise tablet computing device 140, enterprise tablet computing device 150, client computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of application host computing platform 110, message database server 120, mobile device management server 130, enterprise tablet computing device 140, enterprise tablet computing device 150, and client computing device 160 may, in some instances, be special-purpose computing devices configured to perform specific functions.

Referring to FIG. 1B, application host computing platform 110 may include one or more processor(s) 111, memory(s) 112, and communication interface(s) 113. A data bus may interconnect processor 111, memory 112, and communication interface 113. Communication interface 113 may be a network interface configured to support communication between application host computing platform 110 and one or more networks (e.g., network 170, network 180, or the like). Memory 112 may include one or more program modules and/or processing engines having instructions that when executed by processor 111 cause application host computing platform 110 to perform one or more functions described herein and/or one or more databases that may store and/or otherwise maintain information which may be used by such program modules, processing engines, and/or processor 111. In some instances, the one or more program modules, processing engines, and/or databases may be stored by and/or maintained in different memory units of application host computing platform 110 and/or by different computing devices that may form and/or otherwise make up application host computing platform 110. For example, memory 112 may have, store, and/or include an application host module **112*a*, an application host database 112*b*, and a message tracking engine 112*c***.

Application host module **112*a* may have instructions that direct and/or cause application host computing platform 110 to manage and route messages to distributed user devices, as discussed in greater detail below. Application host database 112*b* may store information used by application host module 112*a* and/or application host computing platform 110 in managing and routing messages to distributed user devices in an enterprise computing environment. Message tracking engine 112*c*** may perform and/or provide one or more message tracking functions and/or services, as illustrated in greater detail below.

Figure 2A:
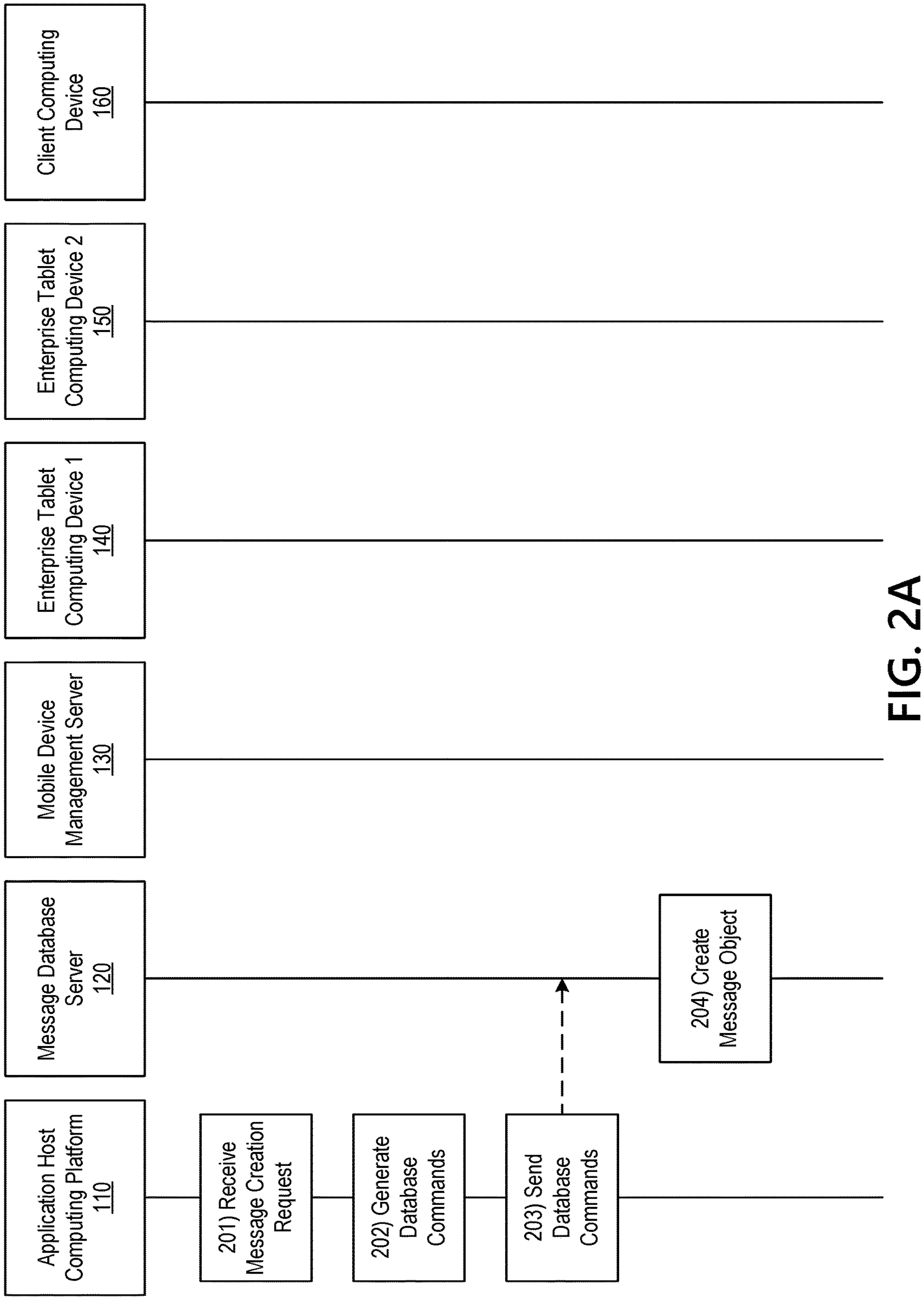
FIGS. 2A-2F depict an illustrative event sequence for managing and routing messages to distributed user devices in an enterprise computing environment in accordance with one or more example embodiments.

FIGS. 2A-2F depict an illustrative event sequence for managing and routing messages to distributed user devices in an enterprise computing environment in accordance with one or more example embodiments. Referring to FIG. 2A, at step 201, application host computing platform 110 may receive a message creation request. For example, at step 201, application host computing platform 110 may receive data from one or more other systems and/or devices defining and/or corresponding to a request to a create a new message to be sent to one or more remote devices, such as enterprise tablet computing device 140 and/or enterprise tablet computing device 150.

In some embodiments, receiving the message creation request may include receiving the message creation request via a web portal provided to an internal enterprise user. For example, in receiving the message creation request at step 201, application host computing platform 110 may receive the message creation request via a web portal provided to an internal enterprise user (e.g., an internal business user who may, e.g., develop and/or support one or more applications on enterprise tablet computing device 140 and/or enterprise tablet computing device 150). The web portal may, for instance, be hosted and/or otherwise provided by application host computing platform 110 and/or another system in computing environment 100.

In some embodiments, receiving the message creation request may include receiving the message creation request via a database interface provided to an enterprise developer. For example, in receiving the message creation request at step 201, application host computing platform 110 may receive the message creation request via a database interface provided to an enterprise developer. For instance, the enterprise developer may create the request on and/or submit the request from an internal administrative computing device in computing environment 100.

In some instances, the new message to be sent (which may, e.g., be defined by the message creation request) may include text and/or other content instructing a recipient (e.g., an enterprise associate or other user) to update software on a recipient computing device (e.g., enterprise tablet computing device 140, enterprise tablet computing device 150). Additionally or alternatively, the new message may profile-specific and targeted for enterprise users having specific profile attributes, as discussed in greater detail below. Additionally or alternatively, the new message may include information identifying new functionality that has been deployed (e.g., in one or more applications on enterprise tablet computing device 140 and/or enterprise tablet computing device 150) and/or information identifying a new code release or recent application launch.

In some instances, the new message to be sent (which may, e.g., be defined by the message creation request) may include text and/or other content reminding a recipient (e.g., an enterprise associate or other user) to perform certain actions and/or tasks (e.g., to complete one or more specific forms). Additionally or alternatively, the new message may include information identifying one or more recent and/or upcoming software updates, icon changes, maintenance, downtime (e.g., of specific application components, such as specific simulators and/or calculators), and/or the like.

At step 202, application host computing platform 110 may generate one or more database commands (e.g., to create the new message requested at step 201 in a message database). For example, at step 202, application host computing platform 110 may generate one or more database commands based on the message creation request.

In some embodiments, generating the one or more database commands based on the message creation request may include generating at least one command that causes the message database server to set one or more flags identifying one or more recipients of a new message, store content of the new message, and set one or more flags identifying an active or inactive status of the new message. For example, in generating the one or more database commands based on the message creation request at step 202, application host computing platform 110 may generate at least one command that causes the message database server (e.g., message database server 120) to set one or more flags identifying one or more recipients of a new message, store content of the new message, and set one or more flags identifying an active or inactive status of the new message.

In some embodiments, generating the at least one command that causes the message database server to set the one or more flags identifying the one or more recipients of the new message may include configuring the at least one command to identify the one or more recipients of the new message based on one or more unique user identifiers corresponding to the one or more recipients of the new message. For example, in generating the at least one command that causes the message database server (e.g., message database server 120) to set the one or more flags identifying the one or more recipients of the new message, application host computing platform 110 may configure the at least one command to identify the one or more recipients of the new message based on one or more unique user identifiers corresponding to the one or more recipients of the new message. For instance, the one or more recipients of the new message may be specified by their corresponding one or more unique user identifiers, and application host computing platform 110 may configure the at least one command to include information identifying these one or more unique user identifiers. As an example, a user of a particular recipient device (e.g., enterprise tablet computing device 140, enterprise tablet computing device 150) may be using an application on the device to interact with specific types of customers, and if a central group within the organization needs to reach that user and/or other users working with those specific types of customers, the central group may request a new message to be sent to that user and/or the other users (e.g., based on their unique user identifiers).

In some embodiments, generating the at least one command that causes the message database server to set the one or more flags identifying the one or more recipients of the new message may include configuring the at least one command to identify the one or more recipients of the new message based on a common enterprise role corresponding to the one or more recipients of the new message. For example, in generating the at least one command that causes the message database server (e.g., message database server 120) to set the one or more flags identifying the one or more recipients of the new message, application host computing platform 110 may configure the at least one command to identify the one or more recipients of the new message based on a common enterprise role corresponding to the one or more recipients of the new message. For instance, the one or more recipients of the new message may be specified by their corresponding job role(s) within the organization, and application host computing platform 110 may configure the at least one command to include user profile information identifying these job role(s). In some instances, application host computing platform 110 alternatively may configure the at least one command to identify the one or more recipients of the new message as being all devices and/or users At step 203, application host computing platform 110 may send the one or more database commands to message database server 120. For example, at step 203, application host computing platform 110 may send, via the communication interface (e.g., communication interface 113), to the message database server (e.g., message database server 120), the one or more database commands generated based on the message creation request. In addition, by sending the one or more database commands to the message database server (e.g., message database server 120), application host computing platform 110 may cause the message database server (e.g., message database server 120) to create a message object in the message database hosted by the message database server (e.g., message database server 120). This approach may, for instance, provide one or more technical advantages over conventional enterprise messaging solutions. For instance, once the message is created in the database, the message is instantly accessible to all tablet users and/or devices (e.g., enterprise tablet computing device 140, enterprise tablet computing device 150), thus enabling real-time message creation and distribution. Moreover, this approach overcomes limitations on conventional enterprise messaging systems, which are imposed by conventional mobile device management and/or policy enforcement architecture, as illustrated in greater detail below.

In some embodiments, sending the one or more database commands to the message database server may cause the message database server to configure the message object to include a tracking parameter for tracking whether message content associated with the message object has been viewed by one or more specific enterprise users. For example, by sending the one or more database commands to the message database server (e.g., message database server 120), application host computing platform 110 may cause the message database server (e.g., message database server 120) to configure the message object to include a tracking parameter for tracking whether message content associated with the message object has been viewed by one or more specific enterprise users (who may, e.g., be using enterprise tablet computing device 140, enterprise tablet computing device 150, and/or other specific enterprise devices).

At step 204, message database server 120 may create a message object based on the one or more database commands received from application host computing platform 110. In some instances, the message object created by message database server 120 at step 204 may include a tracking parameter for tracking which user(s) have viewed the message corresponding to the message object, as discussed above.

Figure 2B:
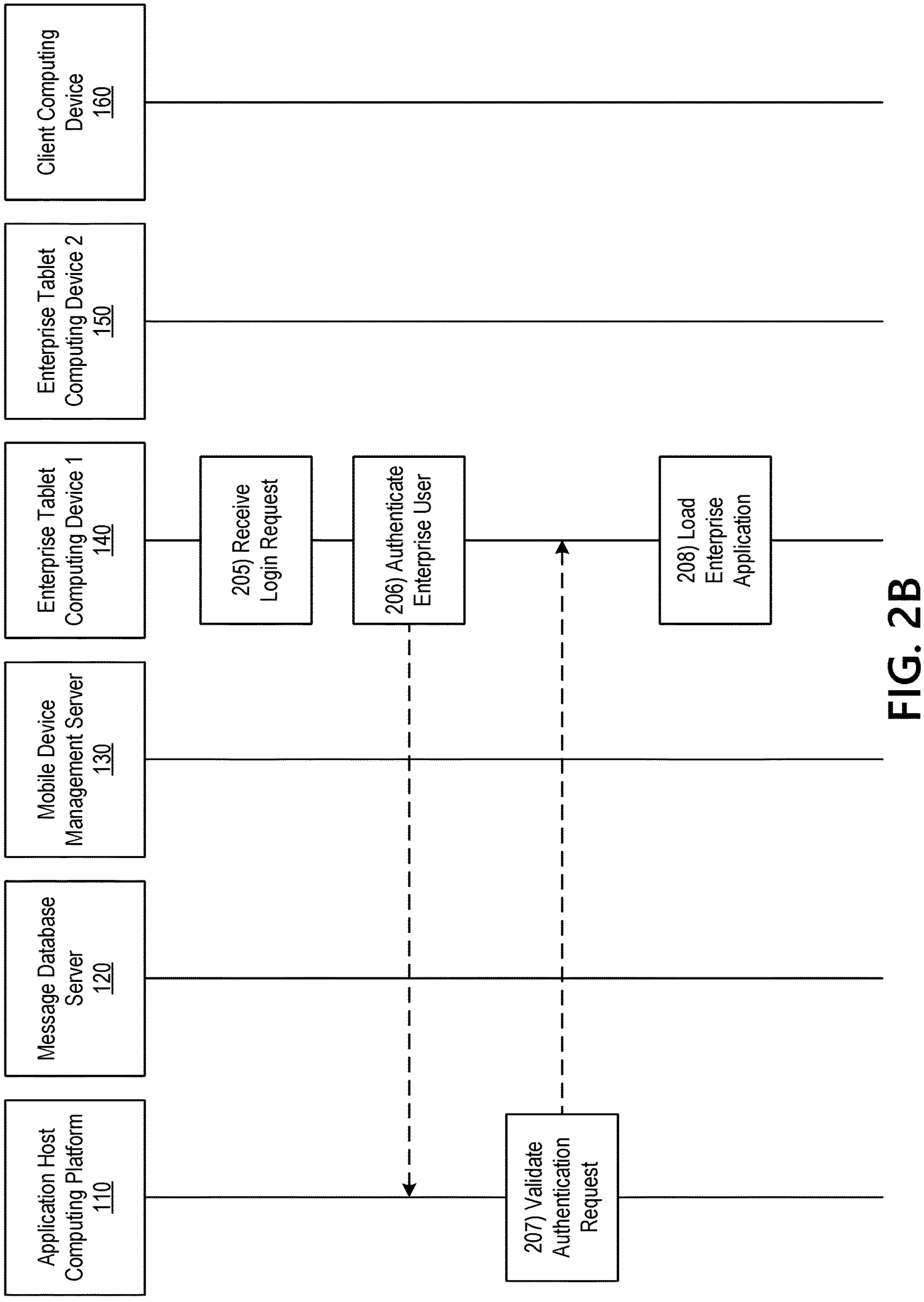

Referring to FIG. 2B, at step 205, enterprise tablet computing device 140 may receive a login request. For instance, enterprise tablet computing device 140 may receive a login request from a user of enterprise tablet computing device 140, who may, e.g., be an employee of an enterprise organization operating application host computing platform 110. At step 206, enterprise tablet computing device 140 may authenticate the user of enterprise tablet computing device 140 as an enterprise user who is authorized to access an enterprise user account (which may, e.g., be linked to secure information on enterprise tablet computing device 140 and/or application host computing platform 110). In some instances, in authenticating the user of enterprise tablet computing device 140 as an enterprise user, enterprise tablet computing device 140 may exchange authentication credentials, authentication input, and/or other data with application host computing platform 110. This data may, for instance, be sent from enterprise tablet computing device 140 to application host computing platform 110 as an authentication request.

At step 207, application host computing platform 110 may validate the authentication request received from enterprise tablet computing device 140. For example, at step 207, prior to receiving an application content request from the first enterprise tablet computing device (e.g., enterprise tablet computing device 140), application host computing platform 110 may validate an authentication request received from the first enterprise tablet computing device (e.g., enterprise tablet computing device 140). In validating the authentication request, application host computing platform 110 may, for instance, confirm that authentication credentials and/or other authentication input received from enterprise tablet computing device 140 is correct and/or otherwise valid.

At step 208, enterprise tablet computing device 140 may load an enterprise application (which may, e.g., be developed and/or deployed by an enterprise organization operating application host computing platform 110). For instance, after authenticating the user of enterprise tablet computing device 140 to an enterprise user account, enterprise tablet computing device 140 may load the enterprise application using the authenticated enterprise user account.

Figure 2C:
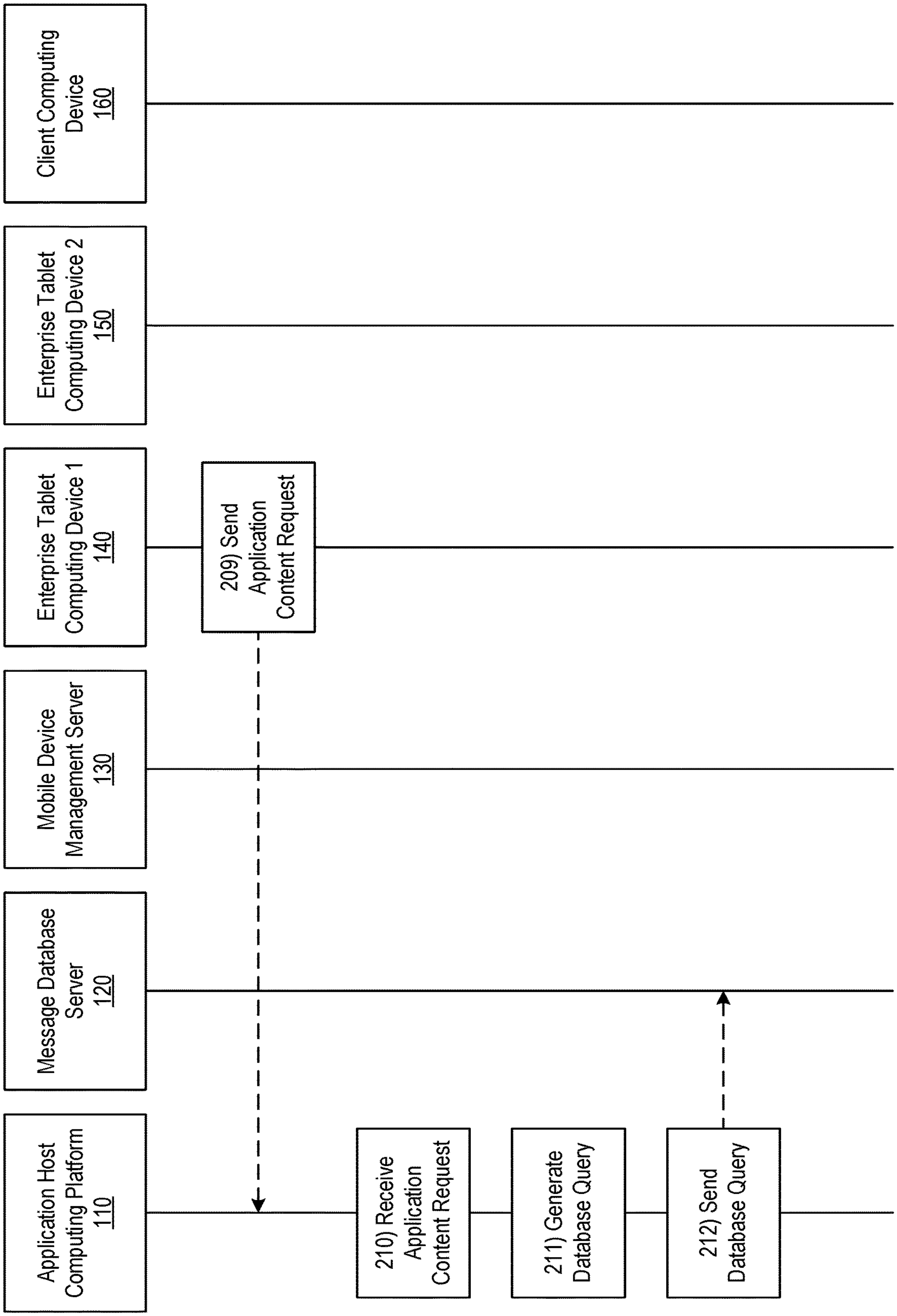

Referring to FIG. 2C, at step 209, enterprise tablet computing device 140 may send an application content request to application host computing platform 110. For example, at step 209, when an enterprise user logs into an enterprise application (e.g., a home screen application, a marketing application, or the like) on enterprise tablet computing device 140, the enterprise application may send a request to the application server (e.g., application host computing platform 110) and check to see if any messages are available. In checking, enterprise tablet computing device 140 may report which user is logged in, so that the application server (e.g., application host computing platform 110) can determine if that user is a specific user or has a user profile that is intended to receive certain pending messages. For instance, the application content request may include information identifying a current user ID and/or user profile associated with the user who is logged into enterprise tablet computing device 140.

At step 210, application host computing platform 110 may receive the application content request from enterprise tablet computing device 140. For example, at step 210, application host computing platform 110 may receive, via the communication interface (e.g., communication interface 113), from a first enterprise tablet computing device (e.g., enterprise tablet computing device 140), an application content request. In addition, the application content request (e.g., received by application host computing platform 110 at step 210) may include user profile information linked to an authenticated user of the first enterprise tablet computing device (e.g., enterprise tablet computing device 140). Such user profile information may, for instance, include a user identifier, user role identifier, and/or other user profile parameters.

In some embodiments, receiving the application content request from the first enterprise tablet computing device may include receiving a unique user identifier linked to the authenticated user of the first enterprise tablet computing device. For example, in receiving the application content request from the first enterprise tablet computing device (e.g., enterprise tablet computing device 140) at step 210, application host computing platform 110 may receive a unique user identifier linked to the authenticated user of the first enterprise tablet computing device (e.g., enterprise tablet computing device 140).

In some embodiments, receiving the application content request from the first enterprise tablet computing device may include receiving enterprise role information identifying a role of the authenticated user of the first enterprise tablet computing device within an enterprise organization associated with the first enterprise tablet computing device. For example, in receiving the application content request from the first enterprise tablet computing device (e.g., enterprise tablet computing device 140) at step 210, application host computing platform 110 may receive enterprise role information identifying a role of the authenticated user of the first enterprise tablet computing device (e.g., enterprise tablet computing device 140) within an enterprise organization associated with the first enterprise tablet computing device (e.g., enterprise tablet computing device 140).

At step 211, application host computing platform 110 may generate a database query based on the application content request. For example, at step 211, application host computing platform 110 may generate a database query based on the application content request received from the first enterprise tablet computing device (e.g., enterprise tablet computing device 140).

At step 212, application host computing platform 110 may send the database query to message database server 120. For example, at step 212, application host computing platform 110 may send, via the communication interface (e.g., communication interface 113), to a message database server (e.g., message database server 120), the database query. In addition, sending the database query to the message database server may cause the message database server to select message data from a message database hosted by the message database server. For example, by sending the database query to the message database server (e.g., message database server 120), application host computing platform 110 may cause the message database server (e.g., message database server 120) to select message data from a message database hosted by the message database server (e.g., message database server 120).

Figure 2D:
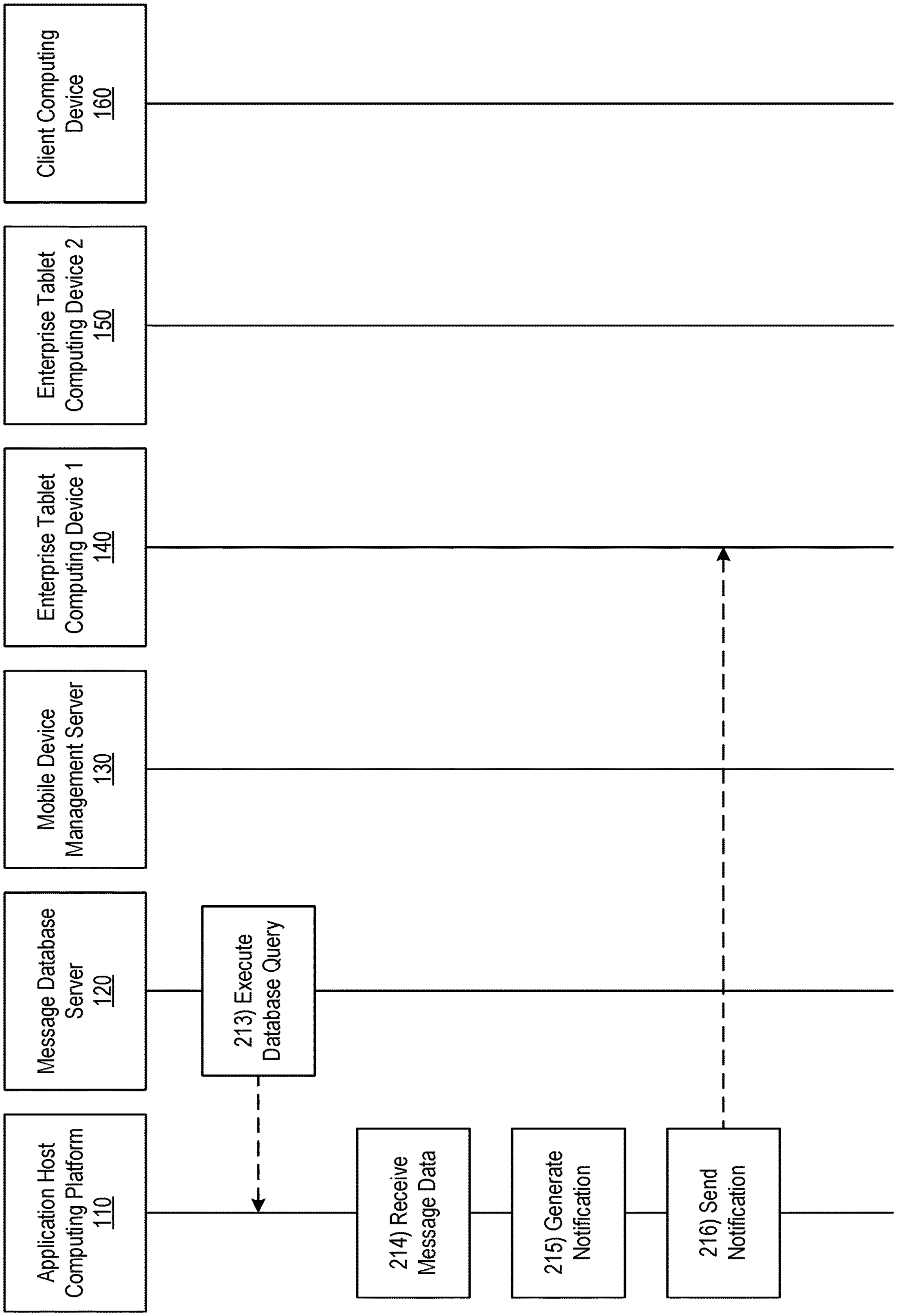

Referring to FIG. 2D, at step 213, message database server 120 may execute the database query. For instance, in executing the database query at step 213, message database server 120 may identify one or more unread messages to be displayed to the user of enterprise tablet computing device 140 based on their user identifier and/or profile parameters.

At step 214, application host computing platform 110 may receive message data from message database server 120. For example, at step 214, after sending the database query to the message database server (e.g., message database server 120), application host computing platform 110 may receive, via the communication interface (e.g., communication interface 113), from the message database server (e.g., message database server 120), the message data selected from the message database hosted by the message database server (e.g., message database server 120).

At step 215, application host computing platform 110 may generate a notification for enterprise tablet computing device 140. For example, at step 215, application host computing platform 110 may generate a notification for the first enterprise tablet computing device (e.g., enterprise tablet computing device 140) based on the message data received from the message database server (e.g., message database server 120). For instance, application host computing platform 110 may generate the notification by creating a data structure that includes the message content and/or other message-associated data received from message database server 120 in connection with the current authenticated user of enterprise tablet computing device 140.

At step 216, application host computing platform 110 may send the notification to enterprise tablet computing device 140. For example, at step 216, application host computing platform 110 may send, via the communication interface (e.g., communication interface 113), to the first enterprise tablet computing device (e.g., enterprise tablet computing device 140), the notification generated for the first enterprise tablet computing device (e.g., enterprise tablet computing device 140) based on the message data received from the message database server (e.g., message database server 120). In addition, by sending the notification generated for the first enterprise tablet computing device (e.g., enterprise tablet computing device 140) based on the message data received from the message database server (e.g., message database server 120), application host computing platform 110 may cause the first enterprise tablet computing device (e.g., enterprise tablet computing device 140) to display the notification generated for the first enterprise tablet computing device (e.g., enterprise tablet computing device 140) based on the message data received from the message database server (e.g., message database server 120).

Figure 2E:
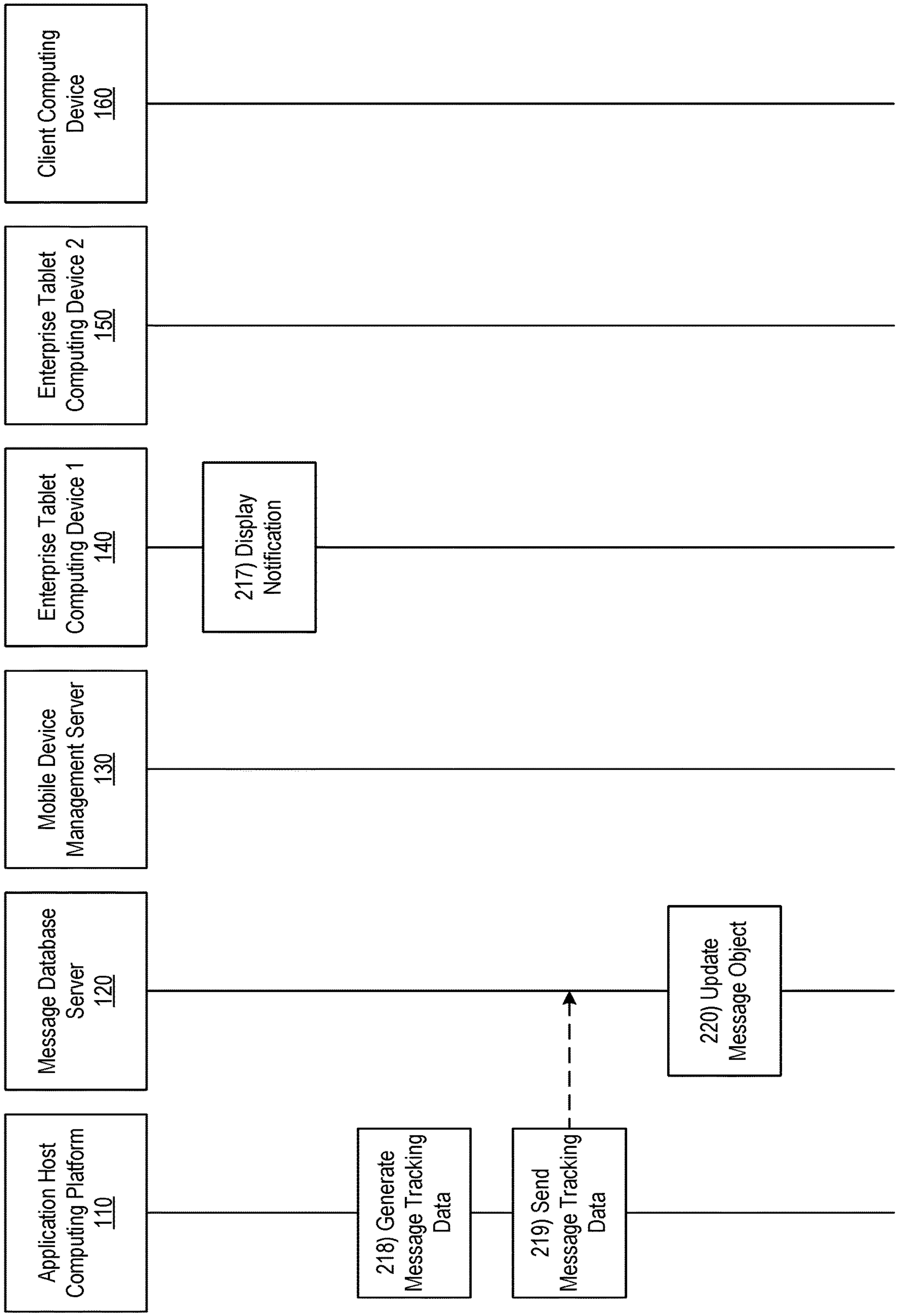
Figure 3:
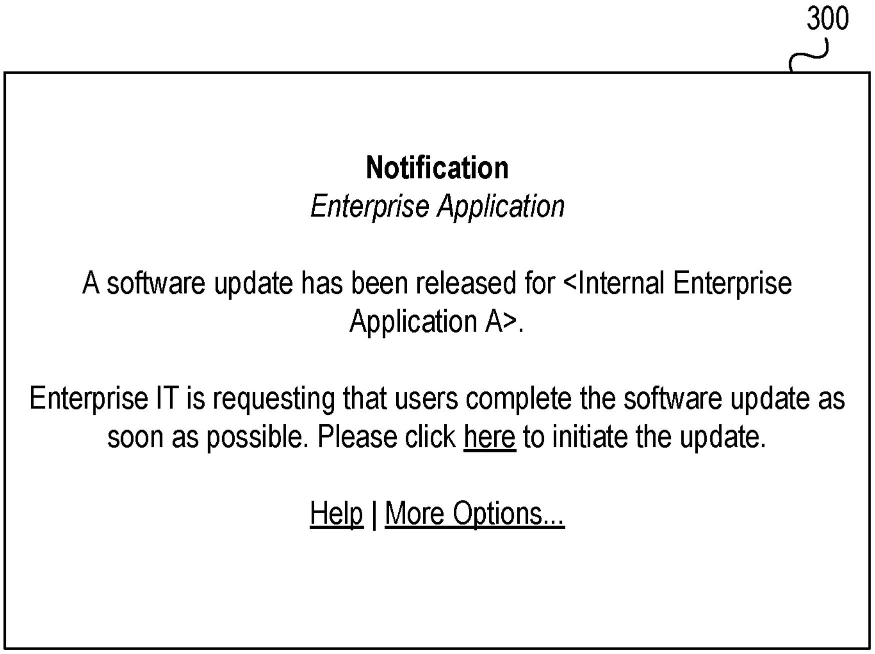
FIGS. 3 and 4 depict example graphical user interfaces for managing and routing messages to distributed user devices in an enterprise computing environment in accordance with one or more example embodiments.

Referring to FIG. 2E, at step 217, enterprise tablet computing device 140 may display the notification received from application host computing platform 110. For example, at step 217, may display and/or otherwise present a graphical user interface that includes the notification, like graphical user interface 300, which is illustrated in FIG. 3. As seen in FIG. 3, graphical user interface 300 may include text and/or other content associated with a message directed to a recipient using enterprise tablet computing device 140 (e.g., "A software update has been released for <Internal Enterprise Application A>. Enterprise IT is requesting that users complete the software update as soon as possible. Please click here to initiate the update. Help|More Options . . . "). In some instances, the notification may be displayed as a modal alert message (e.g., using an application programming interface (API) built into enterprise tablet computing device 140). In this way, application host computing platform 110 and/or enterprise tablet computing device 140 may work around limitations on sending push notifications imposed under mobile device management rules enforced by mobile device management server 130, because enterprise tablet computing device 140 may receive any applicable messages from application host computing platform 110 (e.g., based on the message flags defined in the database maintained by message database server 120) and then subsequently display such messages.

At step 218, application host computing platform 110 may generate message tracking data. For example, at step 218, after sending the notification to the first enterprise tablet computing device (e.g., enterprise tablet computing device 140), application host computing platform 110 may generate message tracking data based on sending the notification to the first enterprise tablet computing device (e.g., enterprise tablet computing device 140). Such message tracking data may, for instance, indicate that the message has been viewed by the current user of enterprise tablet computing device 140. Additionally or alternatively, application host computing platform 110 may generate the message tracking data after the notification is both displayed and acknowledged on enterprise tablet computing device 140. For instance, enterprise tablet computing device 140 may send an acknowledgement message back to application host computing platform 110 after the message is displayed and acknowledged, and the acknowledged message may indicate that a specific user, associated with a specific profile, on the specific device, at a specific time, viewed the message. Any and/or all of this data may be recorded by application host computing platform 110 and/or message database server 120.

At step 219, application host computing platform 110 may send the message tracking data to message database server 120. For example, at step 219, application host computing platform 110 may send the message tracking data to the message database server (e.g., message database server 120). In addition, by sending the message tracking data to the message database server (e.g., message database server 120), application host computing platform 110 may cause the message database server (e.g., message database server 120) to update a tracking parameter of a message object associated with the notification.

At step 220, message database server 120 may update the message data object (e.g., based on the message tracking data received from application host computing platform 110). For instance, message database server 120 may update a message data object associated with the particular message to include information indicating that a specific user, associated with a specific profile, on a specific device (e.g., enterprise tablet computing device 140), at a specific time, viewed the message.

Figure 2F:
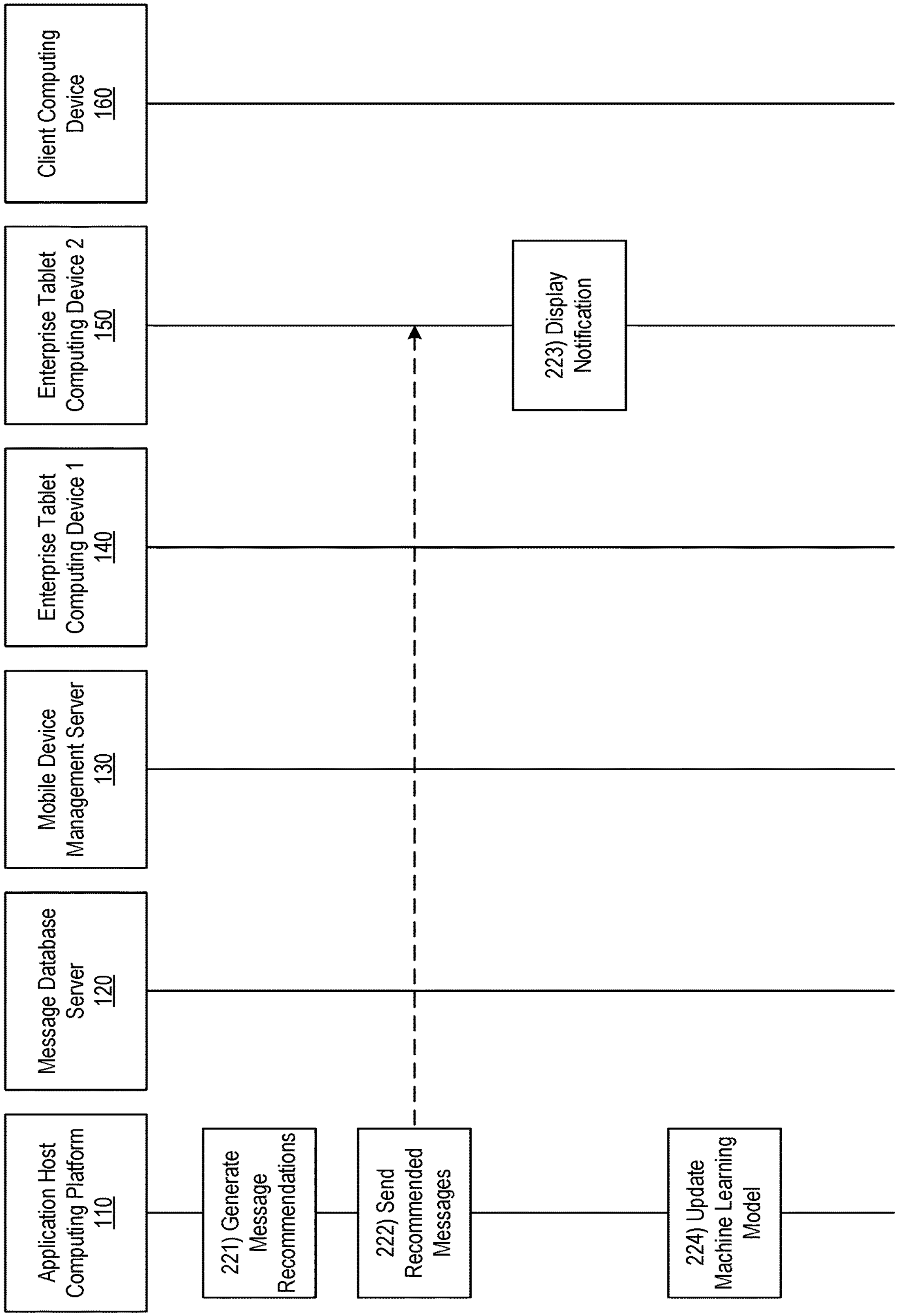

Referring to FIG. 2F, at step 221, application host computing platform 110 may generate one or more message recommendations (e.g., using a machine learning model). For example, at step 221, after sending the notification to the first enterprise tablet computing device (e.g., enterprise tablet computing device 140), application host computing platform 110 may generate one or more message recommendations based on a machine learning model. In doing so, application host computing platform 110 may execute one or more machine learning algorithms to recommend other possible users, user profiles, and/or user groups that should receive a certain message (e.g., the message described in the examples above) based on the message's content and/or other associated message parameters.

At step 222, application host computing platform 110 may send one or more recommended messages to one or more additional devices, such as enterprise tablet computing device 150. For example, at step 222, application host computing platform 110 may send the one or more message recommendations generated based on the machine learning model to a second enterprise tablet computing device (e.g., enterprise tablet computing device 150) different from the first enterprise tablet computing device (e.g., enterprise tablet computing device 140).

Figure 4:
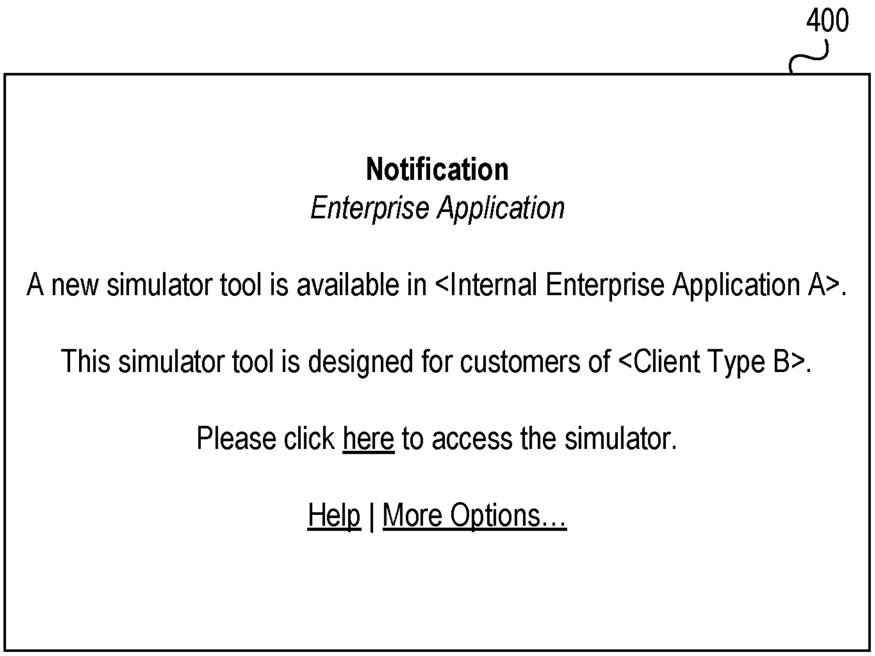

At step 223, enterprise tablet computing device 150 may display a notification associated with the recommended message(s) received from application host computing platform 110. For example, at step 223, may display and/or otherwise present a graphical user interface that includes the notification, like graphical user interface 400, which is illustrated in FIG. 4. As seen in FIG. 4, graphical user interface 400 may include text and/or other content associated with a message directed to a recipient using enterprise tablet computing device 150 (e.g., “A new simulator tool is available in <Internal Enterprise Application A>. This simulator tool is designed for customers of <Client Type B>. Please click here to access the simulator. Help|More Options . . . ”). In some instances, the notification may be displayed as a modal alert message (e.g., using an application programming interface (API) built into enterprise tablet computing device 150). In this way, application host computing platform 110 and/or enterprise tablet computing device 150 may work around limitations on sending push notifications imposed under mobile device management rules enforced by mobile device management server 130, because enterprise tablet computing device 150 may receive any applicable messages from application host computing platform 110 (e.g., based on the message flags defined in the database maintained by message database server 120) and then subsequently display such messages.

At step 224, application host computing platform 110 may update the machine learning model. For example, at step 224, application host computing platform 110 may update the machine learning model based on sending the one or more message recommendations to the second enterprise tablet computing device (e.g., enterprise tablet computing device 150). Additionally or alternatively, application host computing platform 110 may generate and/or send additional message tracking data to message database server 120 (e.g., indicating that the one or more message recommendations have been sent and/or viewed).

Subsequently, one or more steps of the example event sequence described above may be repeated (e.g., as additional messages are received and/or processed). Additionally or alternatively, application host computing platform 110 may execute one or more other steps to provide other functionality. For example, in some instances, an administrative user may request to deactivate a message that was previously active, and application host computing platform 110 may update one or more flags in the database stored on message database server 120 to indicate this change in message state. In some instances, the request to deactivate a message may be received by application host computing platform 110 via a web portal interface provided by application host computing platform 110.

In other instances, an administrative user may request to activate and/or deactivate messaging functionality of some or all users and/or devices, and application host computing platform 110 similarly may update one or more flags in the database stored on message database server 120 to indicate this change in messaging functionality state for some or all users and/or devices. For instance, such a change may be made globally, at the user profile level, or at the user level, and application host computing platform 110 may implement the change by toggling one or more flags in the database stored on message database server 120.

In some instances, messages generated and sent by application host computing platform 110 may be received and displayed by a user device (e.g., enterprise tablet computing device 140, enterprise tablet computing device 150) within an enterprise marketing application. For example, a user of an enterprise tablet (e.g., enterprise tablet computing device 140, enterprise tablet computing device 150) may assist and/or support retail customers in a lobby area of a financial center operated by a financial institution. The marketing application (which may, e.g., be executed by enterprise tablet computing device 140 and/or enterprise tablet computing device 150) may, for instance, be a tool for such users to present marketing content to such customers. The marketing application may, for instance, store and/or display information about various products, as well as provide simulators (e.g., tools for explaining how to use mobile banking, mobile check deposit, or the like), loan calculators, customer rewards info, or the like. The marketing application may, for instance, be used by a user (e.g., of enterprise tablet computing device 140 and/or enterprise tablet computing device 150) as a handbook to start a conversation with a customer. In addition, different types of tools may be provided for assisting different types of customers (e.g., small business banking customers may be assisted using calculators but not simulators, retail customers may be assisted using simulators but not calculators, or the like). In addition, messages may be sent, activated, and/or deactivated (e.g., by application host computing platform 110) based on the user profile and/or role associated with the customer segment being served by a user of a particular tablet device (e.g., enterprise tablet computing device 140, enterprise tablet computing device 150). As discussed above, different messages may be targeted for different user groups by specifying different flags in the database hosted by message database server 120.

Figure 5:
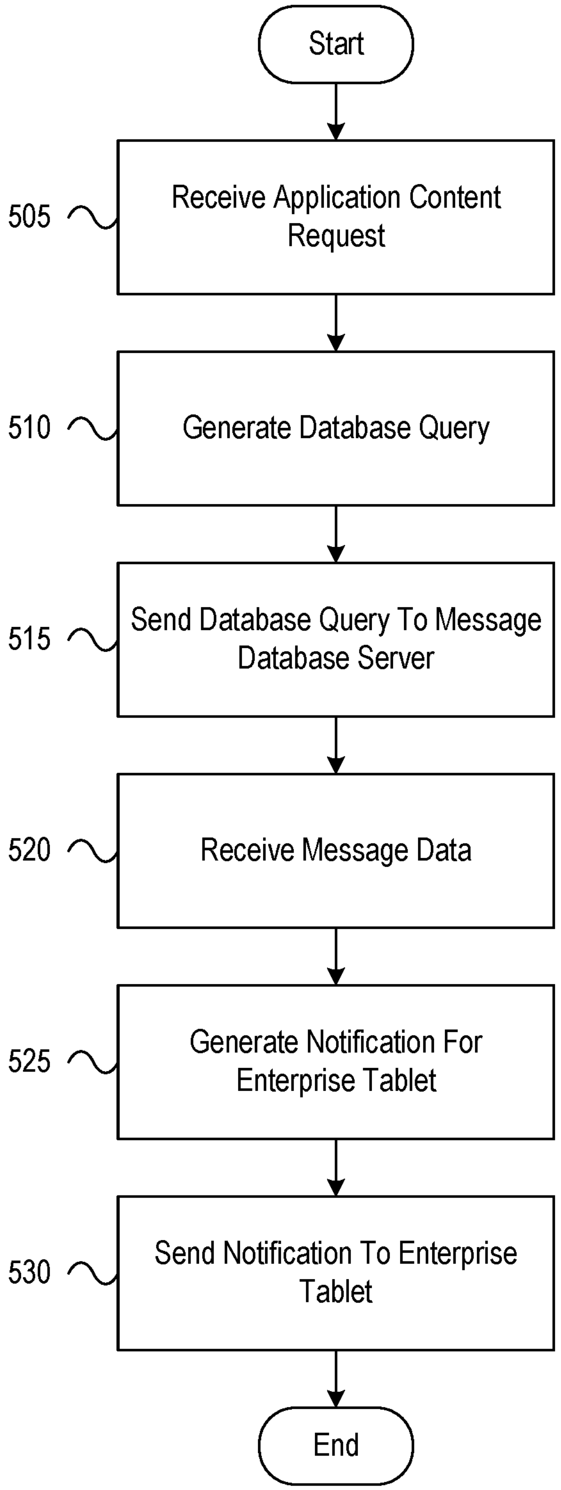
FIG. 5 depicts an illustrative method for managing and routing messages to distributed user devices in an enterprise computing environment in accordance with one or more example embodiments.

FIG. 5 depicts an illustrative method for managing and routing messages to distributed user devices in an enterprise computing environment in accordance with one or more example embodiments. Referring to FIG. 5, at step 505, a computing platform having at least one processor, a communication interface, and memory may receive, via the communication interface, from a first enterprise tablet computing device, an application content request, and the application content request may include user profile information linked to an authenticated user of the first enterprise tablet computing device. At step 510, the computing platform may generate a database query based on the application content request received from the first enterprise tablet computing device. At step 515, the computing platform may send, via the communication interface, to a message database server, the database query, and sending the database query to the message database server may cause the message database server to select message data from a message database hosted by the message database server.

At step 520, after sending the database query to the message database server, the computing platform may receive, via the communication interface, from the message database server, the message data selected from the message database hosted by the message database server. At step 525, the computing platform may generate a notification for the first enterprise tablet computing device based on the message data received from the message database server. At step 530, the computing platform may send, via the communication interface, to the first enterprise tablet computing device, the notification generated for the first enterprise tablet computing device based on the message data received from the message database server, and sending the notification generated for the first enterprise tablet computing device based on the message data received from the message database server may cause the first enterprise tablet computing device to display the notification generated for the first enterprise tablet computing device based on the message data received from the message database server.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
- at least one processor;
- a communication interface communicatively coupled to the at least one processor; and
- memory storing computer-readable instructions that, when executed by the at least one processor, cause the computing platform to:
  - receive, via the communication interface, from a first enterprise tablet computing device, an application content request, wherein the application content request comprises user profile information linked to an authenticated user of the first enterprise tablet computing device;
  - generate a database query based on the application content request received from the first enterprise tablet computing device;
  - send, via the communication interface, to a message database server, the database query, wherein sending the database query to the message database server causes the message database server to select message data from a message database hosted by the message database server;
  - after sending the database query to the message database server, receive, via the communication interface, from the message database server, the message data selected from the message database hosted by the message database server;
  - generate a notification for the first enterprise tablet computing device based on the message data received from the message database server; and
  - send, via the communication interface, to the first enterprise tablet computing device, the notification generated for the first enterprise tablet computing device based on the message data received from the message database server, wherein sending the notification generated for the first enterprise tablet computing device based on the message data received from the message database server causes the first enterprise tablet computing device to display the notification generated for the first enterprise tablet computing device based on the message data received from the message database server.

2. The computing platform of claim 1, wherein receiving the application content request from the first enterprise tablet computing device comprises receiving a unique user identifier linked to the authenticated user of the first enterprise tablet computing device.

3. The computing platform of claim 1, wherein receiving the application content request from the first enterprise tablet computing device comprises receiving enterprise role information identifying a role of the authenticated user of the first enterprise tablet computing device within an enterprise organization associated with the first enterprise tablet computing device.

4. The computing platform of claim 1, wherein the memory stores additional computer-readable instructions that, when executed by the at least one processor, cause the computing platform to:

prior to receiving the application content request from the first enterprise tablet computing device:

receive a message creation request;

generate one or more database commands based on the message creation request; and send, via the communication interface, to the message database server, the one or more database commands generated based on the message creation request, wherein sending the one or more database commands to the message database server causes the message database server to create a message object in the message database hosted by the message database server.

5. The computing platform of claim 4, wherein receiving the message creation request comprises receiving the message creation request via a web portal provided to an internal enterprise user.

6. The computing platform of claim 4, wherein receiving the message creation request comprises receiving the message creation request via a database interface provided to an enterprise developer.

7. The computing platform of claim 4, wherein generating the one or more database commands based on the message creation request comprises generating at least one command that causes the message database server to set one or more flags identifying one or more recipients of a new message, store content of the new message, and set one or more flags identifying an active or inactive status of the new message.

8. The computing platform of claim 7, wherein generating the at least one command that causes the message database server to set the one or more flags identifying the one or more recipients of the new message comprises configuring the at least one command to identify the one or more recipients of the new message based on one or more unique user identifiers corresponding to the one or more recipients of the new message.

9. The computing platform of claim 7, wherein generating the at least one command that causes the message database server to set the one or more flags identifying the one or more recipients of the new message comprises configuring the at least one command to identify the one or more recipients of the new message based on a common enterprise role corresponding to the one or more recipients of the new message.

10. The computing platform of claim 4, wherein sending the one or more database commands to the message database server causes the message database server to configure the message object to include a tracking parameter for tracking whether message content associated with the message object has been viewed by one or more specific enterprise users.

11. The computing platform of claim 1, wherein the memory stores additional computer-readable instructions that, when executed by the at least one processor, cause the computing platform to:

prior to receiving the application content request from the first enterprise tablet computing device, validate an authentication request received from the first enterprise tablet computing device.

12. The computing platform of claim 1, wherein the memory stores additional computer-readable instructions that, when executed by the at least one processor, cause the computing platform to:

after sending the notification to the first enterprise tablet computing device:

generate message tracking data based on sending the notification to the first enterprise tablet computing device; and send the message tracking data to the message database server, wherein sending the message tracking data to the message database server causes the message database server to update a tracking parameter of a message object associated with the notification.

13. The computing platform of claim 1, wherein the memory stores additional computer-readable instructions that, when executed by the at least one processor, cause the computing platform to:

after sending the notification to the first enterprise tablet computing device:

generate one or more message recommendations based on a machine learning model; and send the one or more message recommendations generated based on the machine learning model to a second enterprise tablet computing device different from the first enterprise tablet computing device.

14. The computing platform of claim 13, wherein the memory stores additional computer-readable instructions that, when executed by the at least one processor, cause the computing platform to:

update the machine learning model based on sending the one or more message recommendations to the second enterprise tablet computing device.

15. A method, comprising:

at a computing platform comprising at least one processor, a communication interface, and memory:

receiving, by the at least one processor, via the communication interface, from a first enterprise tablet computing device, an application content request, wherein the application content request comprises user profile information linked to an authenticated user of the first enterprise tablet computing device;

generating, by the at least one processor, a database query based on the application content request received from the first enterprise tablet computing device;

sending, by the at least one processor, via the communication interface, to a message database server, the database query, wherein sending the database query to the message database server causes the message database server to select message data from a message database hosted by the message database server;

after sending the database query to the message database server, receiving, by the at least one processor, via the communication interface, from the message database server, the message data selected from the message database hosted by the message database server;

generating, by the at least one processor, a notification for the first enterprise tablet computing device based on the message data received from the message database server; and sending, by the at least one processor, via the communication interface, to the first enterprise tablet computing device, the notification generated for the first enterprise tablet computing device based on the message data received from the message database server, wherein sending the notification generated for the first enterprise tablet computing device based on the message data received from the message database server causes the first enterprise tablet computing device to display the notification generated for the first enterprise tablet computing device based on the message data received from the message database server.

16. The method of claim 15, wherein receiving the application content request from the first enterprise tablet computing device comprises receiving a unique user identifier linked to the authenticated user of the first enterprise tablet computing device.

17. The method of claim 15, wherein receiving the application content request from the first enterprise tablet computing device comprises receiving enterprise role information identifying a role of the authenticated user of the first enterprise tablet computing device within an enterprise organization associated with the first enterprise tablet computing device.

18. The method of claim 15, comprising:

prior to receiving the application content request from the first enterprise tablet computing device:

receiving, by the at least one processor, a message creation request;

generating, by the at least one processor, one or more database commands based on the message creation request; and sending, by the at least one processor, via the communication interface, to the message database server, the one or more database commands generated based on the message creation request, wherein sending the one or more database commands to the message database server causes the message database server to create a message object in the message database hosted by the message database server.

19. The method of claim 18, wherein receiving the message creation request comprises receiving the message creation request via a web portal provided to an internal enterprise user.

20. One or more non-transitory computer-readable media storing instructions that, when executed by a computing platform comprising at least one processor, a communication interface, and memory, cause the computing platform to:

receive, via the communication interface, from a first enterprise tablet computing device, an application content request, wherein the application content request comprises user profile information linked to an authenticated user of the first enterprise tablet computing device;

generate a database query based on the application content request received from the first enterprise tablet computing device;

send, via the communication interface, to a message database server, the database query, wherein sending the database query to the message database server causes the message database server to select message data from a message database hosted by the message database server;

after sending the database query to the message database server, receive, via the communication interface, from the message database server, the message data selected from the message database hosted by the message database server;

generate a notification for the first enterprise tablet computing device based on the message data received from the message database server; and send, via the communication interface, to the first enterprise tablet computing device, the notification generated for the first enterprise tablet computing device based on the message data received from the message database server, wherein sending the notification generated for the first enterprise tablet computing device based on the message data received from the message database server causes the first enterprise tablet computing device to display the notification generated for the first enterprise tablet computing device based on the message data received from the message database server.

* * * * *